US012619171B2

(12) United States Patent
Ohsawa et al.

(10) Patent No.: US 12,619,171 B2
(45) Date of Patent: May 5, 2026

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Tatsuya Ohsawa, Shizuoka (JP); Kunihiko Sekido, Shizuoka (JP); Shuhei Iwasaki, Kanagawa (JP); Naoyuki Matsumoto, Fukui (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 489 days.

(21) Appl. No.: 18/463,725

(22) Filed: Sep. 8, 2023

(65) Prior Publication Data

US 2024/0118633 A1 Apr. 11, 2024

(30) Foreign Application Priority Data

Sep. 21, 2022 (JP) ................................ 2022-150265

(51) Int. Cl.
*G03G 5/06* (2006.01)
*G03G 5/047* (2006.01)
*G03G 21/18* (2006.01)

(52) U.S. Cl.
CPC ......... *G03G 5/047* (2013.01); *G03G 5/06144* (2020.05); *G03G 5/06145* (2020.05); *G03G 5/0696* (2013.01); *G03G 21/1814* (2013.01)

(58) Field of Classification Search
CPC ........... G03G 5/06145; G03G 5/06142; G03G 5/061443; G03G 5/06144; G03G 5/06147
See application file for complete search history.

(56) References Cited

U.S. PATENT DOCUMENTS

| | | | |
|---|---|---|---|
| 7,141,341 | B2 | 11/2006 | Sekido |
| 8,343,699 | B2 | 1/2013 | Nagasaka |
| 8,465,889 | B2 | 6/2013 | Sekido |
| 8,524,430 | B2 | 9/2013 | Takagi |
| 8,546,050 | B2 | 10/2013 | Maruyama |
| 8,632,931 | B2 | 1/2014 | Sekido |
| 8,795,936 | B2 | 8/2014 | Sekido |
| 9,029,054 | B2 | 5/2015 | Okuda |
| 9,063,505 | B2 | 6/2015 | Sekiya |
| 9,069,267 | B2 | 6/2015 | Kaku |
| 9,207,550 | B2 | 12/2015 | Okuda |

(Continued)

FOREIGN PATENT DOCUMENTS

| | | | |
|---|---|---|---|
| JP | 10-246971 | A | 9/1998 |
| JP | 2010-2696 | A | 1/2010 |
| JP | 2013-178513 | A | 9/2013 |

OTHER PUBLICATIONS

U.S. Appl. No. 18/463,501, Kunihiko Sekido, filed Sep. 8, 2023.
U.S. Appl. No. 18/463,749, Shuhei Iwasaki, filed Sep. 8, 2023.

*Primary Examiner* — Peter L Vajda
(74) *Attorney, Agent, or Firm* — VENABLE LLP

(57) ABSTRACT

An electrophotographic photosensitive member including: a support, a charge generating layer, and a charge transporting layer in this order, wherein the charge transporting layer contains: a compound represented by the formula (A-1), and at least one selected from the group consisting of a compound represented by the formula (A-2) and a compound represented by the formula (A-3).

8 Claims, 3 Drawing Sheets

(56) References Cited

U.S. PATENT DOCUMENTS

| | | | | |
|---|---|---|---|---|
| 9,280,072 | B2 | 3/2016 | Ogaki | |
| 9,335,645 | B2 | 5/2016 | Tagami | |
| 9,442,401 | B2 | 9/2016 | Sekido | |
| 9,477,163 | B2 | 10/2016 | Nishi | |
| 9,760,030 | B2 | 9/2017 | Sekiya | |
| 9,772,568 | B2 | 9/2017 | Sekido | |
| 9,811,011 | B2 | 11/2017 | Nishi | |
| 9,851,648 | B2 | 12/2017 | Nishi | |
| 9,864,285 | B2 | 1/2018 | Nishi | |
| 9,921,498 | B2 | 3/2018 | Sekido | |
| 10,372,050 | B2 | 8/2019 | Nishi | |
| 10,452,021 | B2 | 10/2019 | Miura | |
| 10,545,453 | B2 | 1/2020 | Iwasaki | |
| 10,663,913 | B2 | 5/2020 | Yamaal | |
| 10,831,117 | B2 | 11/2020 | Sakakibara | |
| 10,942,462 | B2 | 3/2021 | Ito | |
| 11,150,566 | B2 | 10/2021 | Iwasaki | |
| 11,392,074 | B2 | 7/2022 | Ishida | |
| 11,726,414 | B2 | 8/2023 | Sekido | |
| 11,782,353 | B2 | 10/2023 | Nakamura | |
| 2013/0209928 | A1 | 8/2013 | Fujii | |
| 2020/0264526 | A1* | 8/2020 | Shimozawa | G03G 5/0664 |
| 2021/0318629 | A1 | 10/2021 | Nishi | |
| 2021/0325794 | A1 | 10/2021 | Iwasaki | |
| 2023/0058278 | A1 | 2/2023 | Maruyama | |
| 2023/0059041 | A1 | 2/2023 | Kaku | |
| 2023/0059773 | A1 | 2/2023 | Yamaai | |
| 2023/0090596 | A1 | 3/2023 | Sekido | |
| 2023/0093328 | A1 | 3/2023 | Nishi | |
| 2023/0115474 | A1 | 4/2023 | Watanabe | |
| 2023/0288836 | A1 | 9/2023 | Iwasaki | |
| 2023/0350314 | A1 | 11/2023 | Sekido | |

* cited by examiner

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present invention relates to an electrophotographic photosensitive member, a process cartridge and an electrophotographic apparatus each having the electrophotographic photosensitive member.

Description of the Related Art

The conventional electrophotographic apparatus has a problem of generating ghost that produces a density difference of a developing toner caused by a difference in dark decay when charged between exposed and unexposed areas. However, in recent years, due to a growing demand for higher image quality, higher process speed and higher resistance to environmental change, it is necessary to suppress the ghost more.

On the other hand, the electrophotographic photosensitive member requires a highly transportable substance that rapidly extracts holes generated from a charge generating substance and prevent holes from retaining in the electrophotographic photosensitive member during one process of charging and exposure. The spatial arrangement or the highest occupied molecular orbital (called HOMO) of the charge transporting substance in the charge transporting layer is considered to cause holes to retain during the one process by acting as a carrier trap for holes. For example, the presence of low-energy HOMO levels can trap holes energetically, and the distant charge transporting substance can inhibit the carrier paths of the holes and encourage the holes to retain. Therefore, spatial expansion of HOMO and suppression of trapping sites such as energetic disorder of the charge transporting substance have been required and a charge transporting layer that can suppress trapping sites of holes and does not interfere with transfer of holes has been required.

Japanese Patent Application Laid-Open No. 2013-178513 discloses that the use of a diphenylbenzidine derivative as a charge transporting substance improves the resistance against cracking attributable to a contact member and suppresses the ghost. Japanese Patent Application Laid-Open No. H10-246971 discloses that the use of a diphenylbenzidine derivative as a charge transporting substance improves image properties such as sensitivity and the residual electric potential. Japanese Patent Application Laid-Open No. 2010-2696 discloses that the use of a triarylamine derivative as a charge transporting substance suppresses carrier retain to suppress the ghost by effectively enlarging orbital expansion and overlapping.

Due to a growing demand for higher image quality, higher process speed and higher resistance to environmental change in recent years, it is required to suppress the image quality degradation due to ghost phenomenon and to improve the image quality in various process conditions. Especially, it is required to suppress the ghost at the high process speed.

However, as a result of the investigation by the inventors of the present invention, it was found that the evaluation machines (HP Color LaserJet 4700dn, or the like) having the process speed of 30 ppm were used for the evaluations of the electrophotographic photosensitive members in Japanese Patent Application Laid-Open No. 2013-178513, Japanese Patent Application Laid-Open No. H10-246971, and Japanese Patent Application Laid-Open No. 2010-2696, and the electrophotographic photosensitive members may not be able to sufficiently suppress the ghost in recent high-speed processes.

The electrophotographic photosensitive member requires a highly transportable substance that rapidly extracts holes generated from a charge generating substance and prevent holes from retaining in the electrophotographic photosensitive member during one process of charging and exposure. The spatial arrangement or the highest occupied molecular orbital (called HOMO) of the charge transporting substance in the charge transporting layer is considered to cause holes to retain during the one process by acting as a carrier trap for holes. For example, the presence of low-energy HOMO levels can trap holes energetically, and the distant charge transporting substance can inhibit the carrier paths of the holes and encourage the holes to retain. Therefore, spatial expansion of HOMO and suppression of trapping sites such as energetic disorder of the charge transporting substance have been required. The spatial expansion of HOMO and uniformity of energy of the charge transporting substance are considered necessary.

SUMMARY OF THE INVENTION

Therefore, it is an object of the present invention to provide an electrophotographic photosensitive member which can suppress the ghost in a high-speed process by using the charge transporting substance having the spatial expansion of HOMO and uniformity of energy.

The above object is achieved by the present invention described below. That is, the electrophotographic photosensitive member according to the present invention is an electrophotographic photosensitive member comprising: a support, a charge generating layer, and a charge transporting layer in this order, wherein the charge transporting layer comprises: a compound represented by a following formula (A-1), and at least one selected from the group consisting of a compound represented by a following formula (A-2) and a compound represented by a following formula (A-3).

(A-1)

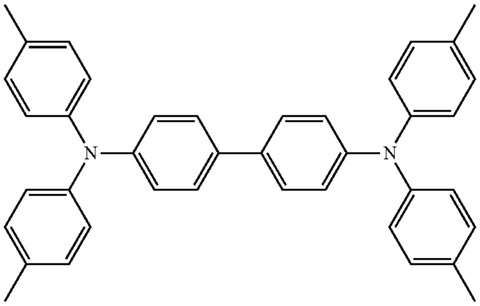

-continued (A-2)

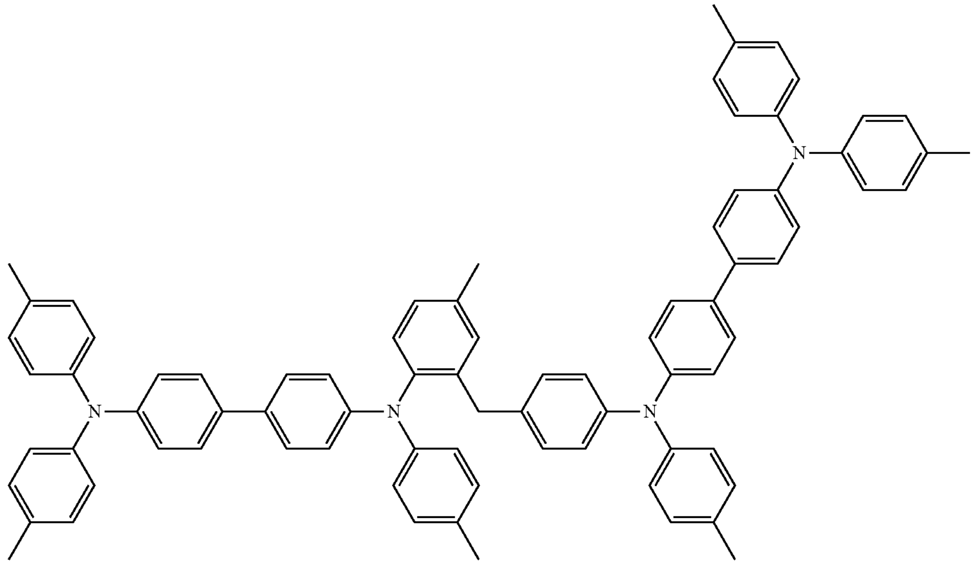

(A-3)

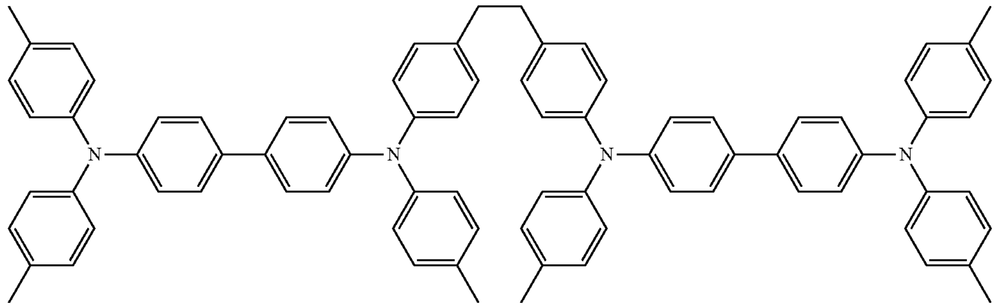

According to another aspect of the present invention, a process cartridge comprising: the electrophotographic photosensitive member and at least one unit selected from the group consisting of a charging unit, a developing unit, and a cleaning unit, the process cartridge integrally supporting the electrophotographic photosensitive member and the at least one unit, and being detachably attachable to a main body of an electrophotographic apparatus is provided.

Further, according to another aspect of the present invention, an electrophotographic apparatus comprising: the electrophotographic photosensitive member, an exposing unit, a charging unit, a developing unit, and a transfer unit is provided.

Further features of the present invention will become apparent from the following description of exemplary embodiments with reference to the attached drawings.

DESCRIPTION OF THE EMBODIMENTS

The present invention will be described in detail below with reference to the exemplary embodiments.

As a result of the investigation, the inventors of the present invention have found that the conventional electrophotographic photosensitive member is likely to be affected by the ghost, which is a difference in dark decay between exposed and unexposed areas, when the printing process speed of the electrophotographic apparatus is faster than that of the conventional one. The reason for this is assumed to be that the shorter time between charging and developing increases the amount of the photocarrier inside the electrophotographic photosensitive member that are retained instead of being ejected. In particular, it is assumed that the ejection of holes of the charge transporting substance in the thick charge transporting layer contributes to the carrier retain.

As a result of repeated investigations by the inventors in order to solve the above problems of the conventional technology, it has been found that ghost can be suppressed by combining the certain materials in a high-speed process by the electrophotographic apparatus.

That is, the electrophotographic photosensitive member according to the present invention is an electrophotographic photosensitive member including: a support, a charge generating layer, and a charge transporting layer in this order, wherein the charge transporting layer contains: a compound represented by the formula (A-1), and at least one selected from the group consisting of a compound represented by the formula (A-2) and a compound represented by the formula (A-3).

Further, the present invention relates to a process cartridge including: the electrophotographic photosensitive member and at least one unit selected from the group consisting of a charging unit, a developing unit, and a cleaning unit, the process cartridge integrally supporting the electrophotographic photosensitive member and the at least one unit, and being detachably attachable to a main body of an electrophotographic apparatus.

Further, the present invention relates to an electrophotographic apparatus including: the electrophotographic photosensitive member, an exposing unit, a charging unit, a developing unit, and a transfer unit.

The electrophotographic photosensitive member of the present invention contains at least one selected from the group consisting of the compound represented by the formula (A-2) and the compound represented by the formula (A-3).

Figure 1:
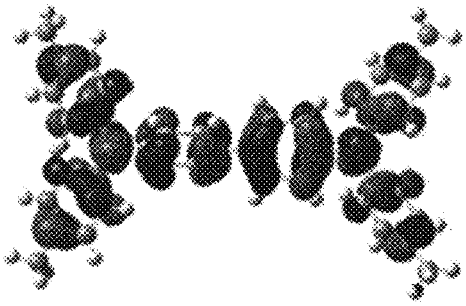
FIG. 1 is a view for illustrating an example of the electronic state of the compound used in the present invention.
Figure 2:
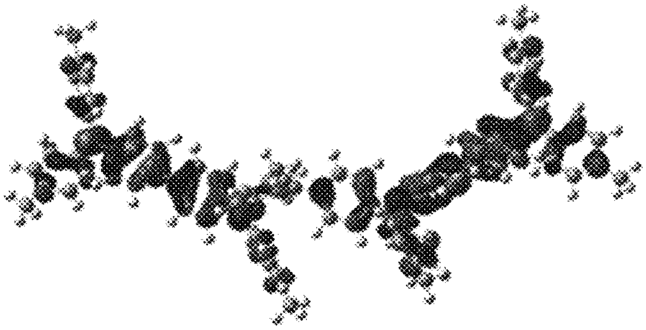
FIG. 2 is a view for illustrating another example of the electronic state of the compound used in the present invention.
Figure 3:
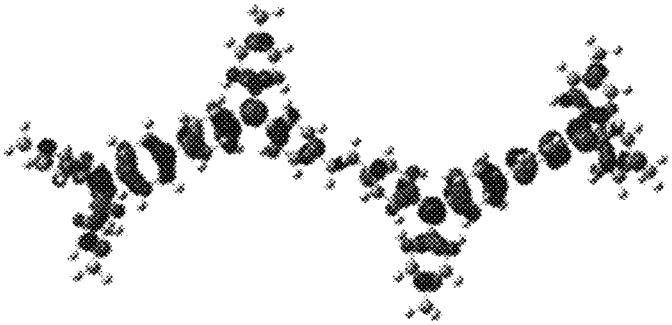
FIG. 3 is a view for illustrating another example of the electronic state of the compound used in the present invention.

The inventors have found that when the charge transporting layer contains at least one selected from the group consisting of the compound represented by the formula (A-2) and the compound represented by the formula (A-3), the ghost is suppressed. The inventors attribute this to the fact that since the compound represented by the formula (A-2) and the compound represented by the formula (A-3) have skeletons very similar to that of the compound represented by the formula (A-1) (hereinafter, also called charge transporting compound (A-1)), the HOMO levels thereof are close to each other, and the HOMOs thereof are expanded, thereby forming the paths of the holes. According to the density functional formalism using the quantum chemical calculation (GAUSSIAN09), the HOMO level of the charge transporting compound (A-1) is −4.56 eV, the HOMO level of the compound represented by the formula (A-2) is −4.57 eV, and the HOMO level of the compound represented by the formula (A-3) is −4.55 eV, indicating energies close to each other. In addition, the compound represented by the formula (A-2) and the compound represented by the formula (A-3) are bonded by a non-conjugate bond in spite of the expansion of their molecular skeletons, thereby suppressing great changes in energy. It is expected that expansion of the molecular skeletons expands the HOMOs and forms the paths of holes, as shown in FIGS. 1 to 3.

In particular, in the charge transporting layer, the content "A2" of the compound represented by the formula (A-2) is preferably 0.019 to 0.070 mass %, the content "A3" of the compound represented by the formula (A-3) is preferably 0 to 0.058 mass %, and the sum of the content "A2" of the compound represented by the formula (A-2) and the content "A3" of the compound represented by the formula (A-3) is preferably 0.019 to 0.129 mass %. The reason for this is assumed as follows. Although the compound represented by the formula (A-3) has a close HOMO energy, the compound has lower energy than that of the charge transporting compound (A-1). Hence, the compound represented by the formula (A-3) seems to function as a trap site of holes when more than a certain amount of the compound is added. However, when a certain amount or less of the compound is added, it seems to extend the paths of the holes without having an energetically hindering effect on the holes. On the other hand, the compound represented by the formula (A-2) differs from the compound represented by the formula (A-3) in that the effect of the energetic hindrance of the HOMO is small, but when more than a certain amount of the compound is added, it seems to interfere with the transport of the holes by the charge transporting compound (A-1) due to its molecular configuration. The inventors believe that the compound represented by the formula (A-2) and the compound represented by the formula (A-3) should be added to such an extent that the compounds do not become trap sites for the holes, and the paths of the holes should be formed without causing the disadvantage due to their molecular configurations.

As in the mechanism described above, it is possible to achieve the effect of the present invention by the synergistic effect of each configuration.

[Electrophotographic Photosensitive Member]

The electrophotographic photosensitive member of the present invention includes a support, a charge generating layer, and a charge transporting layer in this order.

As a method of producing the electrophotographic photosensitive member of the present invention, there is given, for example, a method involving preparing coating liquids for respective layers to be described later, applying the coating liquids for the respective layers in a desired order, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

The respective layers are described below.

<Support>

In the present invention, the electrophotographic photosensitive member includes a support. In the present disclosure, the support is preferably an electroconductive support having electroconductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support. Examples of the metal include aluminum, iron, nickel, copper, gold, stainless steel, and alloys thereof. Of those, aluminum is preferred, and the support is preferably an aluminum support.

In addition, electroconductivity may be imparted to the resin or the glass through treatment involving, for example, mixing or coating the resin or the glass with an electroconductive material.

<Electroconductive Layer>

In the present invention, an electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles may each be of a laminated configuration having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, silicone oil, resin particles, or a concealing agent such as titanium oxide.

The average film thickness of the electroconductive layer is preferably 1 to 50 μm, particularly preferably 3 to 40 μm.

The electroconductive layer may be formed by preparing a coating liquid for an electroconductive layer containing the above-mentioned respective materials and a solvent, forming a coating film thereof, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. The dispersion method for dispersing the electroconductive particles in the coating liquid for an electroconductive layer is, for example, a method involving using a paint shaker, a sand mill, a ball mill, or a liquid collision type high-speed disperser.

<Undercoat Layer>

In the present invention, an undercoat layer may be arranged on the support or the electroconductive layer. The arrangement of the undercoat layer can improve an adhesive function between the layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a carbon-carbon double bond group.

In addition, the undercoat layer may further contain an electron transporting substance, a metal oxide, a metal, an electroconductive polymer, and the like for the purpose of improving electric characteristics. Of those, an electron transporting substance and a metal oxide are preferably used.

Examples of the electron transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used and copolymerized with the above-mentioned monomer having a polymerizable functional group to form an undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The undercoat layer has an average film thickness of preferably from 0.1 to 50 μm, more preferably from 0.2 to 40 μm, particularly preferably from 0.3 to 30 μm.

The undercoat layer may be formed by preparing a coating liquid for an undercoat layer containing the above-mentioned respective materials and a solvent, forming a coating film thereof, and drying and/or curing the coating film. Examples of the solvent to be used for the coating liquid include an alcohol-based solvent, a ketone-based solvent, an ether-based solvent, an ester-based solvent, and an aromatic hydrocarbon-based solvent.

<Charge Generating Layer>

In the present invention, a charge generating layer is arranged on the support.

The charge generating layer preferably contains a charge generating substance and a resin.

Examples of the charge generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanin pigment, a chlorogallium phthalocyanine pigment, and a hydroxygallium phthalocyanine pigment are preferable. Among them, a pigment containing hydroxy phthalocyanine such as a hydroxygallium phthalocyanine pigment is particularly preferable. When the pigment is used, the energy matching between the charge generating layer and the charge transporting layer becomes great and the carrier is not retained, which is effective in suppressing the ghost.

The content of the charge generating substance in the charge generating layer is preferably 40 to 85 mass %, more preferably 60 to 80 mass %, with respect to the total mass of the charge generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is preferable.

In addition, the charge generating layer may further contain an additive such as an antioxidant or an ultraviolet absorber. Specific examples thereof can include a hindered phenol compound, a hindered amine compound, a sulfur compound, a phosphorus compound, and a benzophenone compound.

The average film thickness of the charge generating layer is preferably 0.1 to 1 μm, and more preferably 0.15 to 0.4 μm.

The charge generating layer can be formed by preparing a coating liquid for a charge generating layer containing the above-mentioned respective materials and a solvent, forming a coating film thereof, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent.

<Charge Transporting Layer>

In the present invention, a charge transporting layer is arranged on the charge generating layer.

The charge transporting layer preferably contains the charge transporting substance and a resin.

Examples of the charge transporting substance (charge transporting compound) include a polycyclic aromatic compound, a heterocyclic compound, a hydrazone compound, a styryl compound, an enamine compound, a benzidine compound, a triarylamine compound and a resin having a group derived from any of these substances. Of those, a triarylamine compound and a benzidine compound are preferable.

The content of the charge transporting substance in the charge transporting layer is preferably 25 to 70 mass %, more preferably 30 to 55 mass %, with respect to the total mass of the charge transporting layer.

Examples of the resin include a polyester resin, a polycarbonate resin, an acrylic resin and a polystyrene resin. Of those, a polycarbonate resin and a polyester resin are preferable. As a polyester resin, a polyarylate resin is particularly preferable.

The content ratio (mass ratio) of the charge transporting substance to the resin is preferably 4:10 to 20:10, and more preferably 6:10 to 10:10.

It is preferred that the charge transporting layer contains a binder resin, and the content of the compound represented by the formula (A-1) with respect to the content of the binder resin is 60 to 100 mass % in the charge transporting layer. With this configuration, it is possible to provide the electrophotographic photosensitive member which can suppress the ghost in a high-speed process.

It is preferred that the content of the compound represented by the following formula (C-1) with respect to the content of the compound represented by the formula (A-1) is 43 mass % or less in the charge transporting layer, and the content of the compound represented by the following formula (C-2) with respect to the content of the compound represented by the formula (A-1) is 43 mass % or less in the charge transporting layer. With this configuration, it is possible to provide the electrophotographic photosensitive member which can suppress the ghost in a high-speed process.

(C-1)

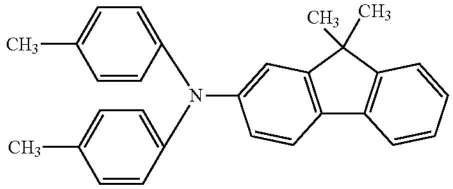

-continued (C-2)

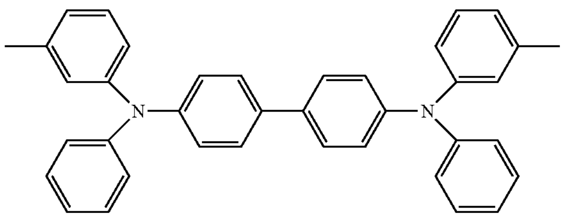

In addition, it is preferred that the sum of the content of the compound represented by the formula (A-2), the content of the compound represented by the formula (A-3), the content of the compound represented by the formula (C-1) and the content of the compound represented by the formula (C-2) with respect to the content of the compound represented by the formula (A-1) is 43 mass % or less in the charge transporting layer. With this configuration, it is possible to provide the electrophotographic photosensitive member which can suppress the ghost in a high-speed process.

In addition, the charge transporting layer may also contain an additive such as an antioxidant, an ultraviolet absorber, a plasticizer, a leveling agent, a lubricity imparting agent, or an abrasion resistance improver. Specific examples thereof include a hindered phenol compound, a hindered amine compound, a sulfur compound, a phosphorus compound, a benzophenone compound, a siloxane-modified resin, silicone oil, fluorine resin particles, polystyrene resin particles, polyethylene resin particles, silica particles, alumina particles, and boron nitride particles.

The average film thickness of the charge transporting layer is preferably 5 to 50 μm, more preferably 8 to 40 μm, and particularly preferably 10 to 30 μm.

The charge transporting layer may be formed by preparing a coating liquid for a charge transporting layer containing the above-mentioned respective materials and a solvent, forming a coating film thereof, and drying the coating film. Examples of the solvent to be used for the coating liquid include an alcohol-based solvent, a ketone-based solvent, an ether-based solvent, an ester-based solvent, and an aromatic hydrocarbon-based solvent. Of those, an ether-based solvent or an aromatic hydrocarbon-based solvent is preferred.

<Protection Layer>

In the present invention, a protection layer may be arranged on the charge transporting layer. The arrangement of the protection layer can improve durability.

It is preferred that the protection layer contains electroconductive particles and/or a charge transporting substance, and a resin.

Examples of the electroconductive particles include particles of metal oxides, such as titanium oxide, zinc oxide, tin oxide, and indium oxide.

Examples of the charge transporting substance include a polycyclic aromatic compound, a heterocyclic compound, a hydrazone compound, a styryl compound, an enamine compound, a benzidine compound, a triarylamine compound and a resin having a group derived from any of these substances. Of those, a triarylamine compound and a benzidine compound are preferable.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protection layer may be formed as a cured film by polymerizing a composition containing a monomer having a polymerizable functional group. A reaction at that time is, for example, a thermal polymerization reaction, a photopolymerization reaction, or a radiation polymerization reaction. Examples of the polymerizable functional group of the monomer having a polymerizable functional group include an acryloyl group and a methacryloyl group. A material having a charge transporting ability may be used as the monomer having a polymerizable functional group.

The protection layer may contain an additive, such as an antioxidant, a UV absorber, a plasticizer, a leveling agent, a lubricity imparting agent, or an abrasion resistance improver. Specific examples thereof include a hindered phenol compound, a hindered amine compound, a sulfur compound, a phosphorus compound, a benzophenone compound, a siloxane-modified resin, silicone oil, fluorine resin particles, polystyrene resin particles, polyethylene resin particles, silica particles, alumina particles, and boron nitride particles.

The average film thickness of the protection layer is preferably 0.5 to 10 μm, more preferably 1 to 7 μm.

The protection layer may be formed by preparing a coating liquid for a protection layer containing the above-mentioned respective materials and a solvent, forming a coating film thereof, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The protection layer is preferably a resin having a structure represented by the following general formula (O-1) or a structure represented by the following general formula (O-2).

(O-1)

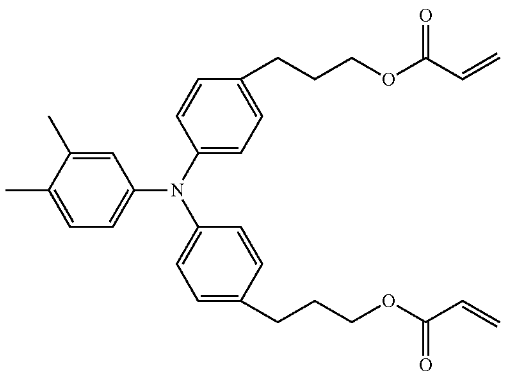

-continued (O-2)

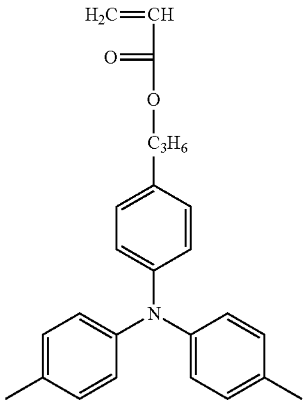

[Process Cartridge and Electrophotographic Apparatus]

The process cartridge of the present invention includes the above-mentioned electrophotographic photosensitive member and at least one unit selected from the group consisting of a charging unit, a developing unit, and a cleaning unit, the process cartridge integrally supporting the electrophotographic photosensitive member and the at least one unit, and being detachably attachable to a main body of an electrophotographic apparatus.

The electrophotographic apparatus of the present invention includes the above-mentioned electrophotographic photosensitive member, a charging unit, an exposing unit, a developing unit, and a transfer unit.

Figure 4:
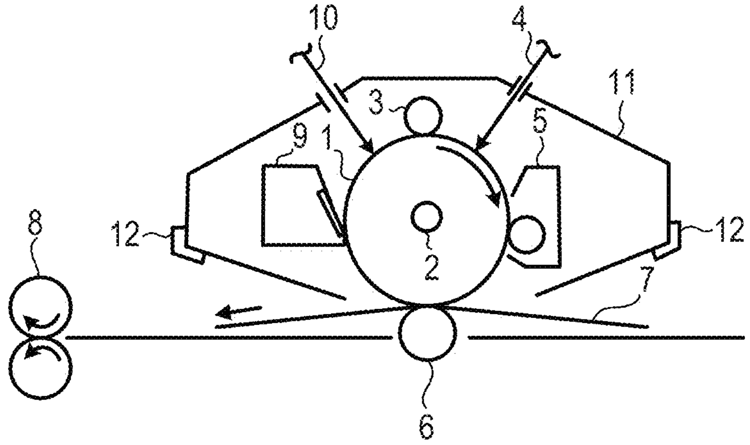
FIG. 4 is a view for illustrating an example of the schematic configuration of the electrophotographic apparatus having the process cartridge including the electrophotographic photosensitive member of the present invention.

An example of the schematic configuration of an electrophotographic apparatus including the process cartridge including the electrophotographic photosensitive member is illustrated in FIG. 4.

An electrophotographic photosensitive member 1 is in a cylindrical shape and is rotationally driven about a shaft 2 in a direction indicated by the arrow at a predetermined peripheral speed. The surface of the electrophotographic photosensitive member 1 is charged to a positive or negative predetermined potential by a charging unit 3. Although a roller charging system based on a roller type charging member is illustrated in FIG. 4, another charging system, such as a corona charging system, a contact charging system, or an injection charging system, may be adopted. The charged surface of the electrophotographic photosensitive member 1 is irradiated with exposure light 4 from an exposing unit (not shown), and thus an electrostatic latent image corresponding to the target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 onto which the toner image has been transferred is conveyed to a fixing unit 8, is subjected to treatment for fixing the toner image, and is printed out to the outside of the electrophotographic apparatus. The electrophotographic apparatus may include a cleaning unit 9 for removing a deposit such as the toner remaining on the surface of the electrophotographic photosensitive member 1 after the transfer. In addition, a so-called cleaner-less system configured to remove the deposit with the developing unit or the like without separate arrangement of the cleaning unit may be used. The electrophotographic apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12 such as a rail may be arranged for detachably attaching a process cartridge 11 of the present invention onto the main body of the electrophotographic apparatus.

The electrophotographic photosensitive member of the present invention may be used in, for example, a laser beam printer, an LED printer, and a copying machine.

According to the present invention, an electrophotographic photosensitive member which can suppress the ghost in a high-speed process can be provided.

EXAMPLES

The present invention is described in more detail below by way of Examples and Comparative Examples. The present invention is by no means limited to the following Examples as long as its modifications do not deviate from the gist of the present disclosure. In the description of the present specification, the terms "part(s)" and "%" are on mass basis unless otherwise stated.

Synthesis of Compound

The confirmation of the compounds and the like to be used for the present invention was conducted by the following mass analysis method.

A matrix-assisted laser desorption ionization time-of-flight mass spectrometer (MALDI-TOF MS: ultraflex, manufactured by Bulker Daltonics, Inc.) was used. The measurement was conducted by the following conditions, and the molecular weight of the object was confirmed based on the obtained peak top value. Acceleration voltage: 20 kV, mode: Reflector, molecular weight standard: fullerene C60.

Synthesis Example 1

Synthesis of Compound (A-2)

(A-2)

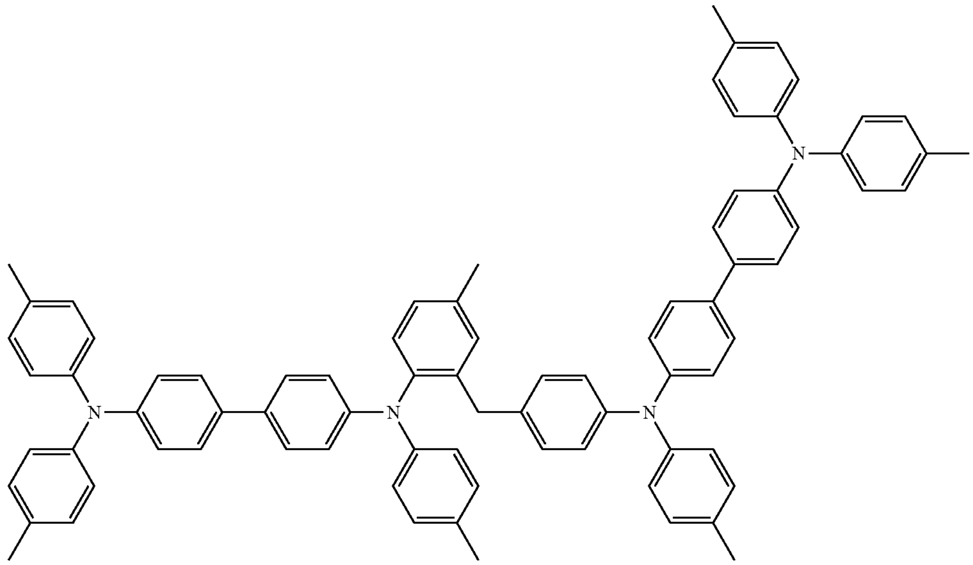

Under a flow of nitrogen at 0° C., 10 parts of N,N,N',N'-Tetrakis(p-tolyl)benzidine (manufactured by Tokyo Chemical Industry Co., Ltd.), 0.33 part of N-bromosuccinimide (manufactured by Tokyo Chemical Industry Co., Ltd.), and 0.002 part of azobisisobutyronitrile (manufactured by Tokyo Chemical Industry Co., Ltd.) were added to a 300 ml three-necked flask containing 150 parts of carbon tetrachloride. The mixture was stirred for 2 hours under a flow of nitrogen at 0° C., followed by stirring for 2 hours at room temperature.

After the reaction, the reaction solution was concentrated under reduced pressure, toluene was added to the residue, followed by filtration, and the filtrate was concentrated in an evaporator and purified by the silica gel column chromatography (development solvent: n-heptane/toluene). Further, the collected product was recrystallized in a toluene/hexane mixture solution to give 1.2 parts of the compound represented by the following formula (111).

This compound was measured by MALDI-TOF MS, and the peak top value thereof was 622.

(111)

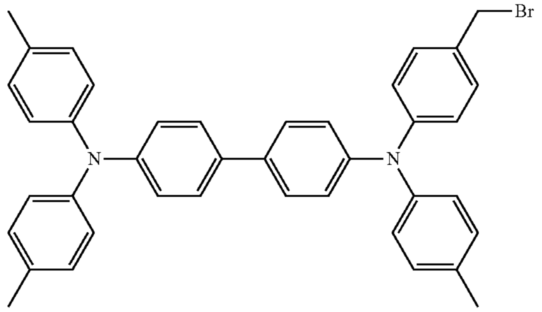

Subsequently, under a flow of nitrogen at 0° C., 10 parts of the compound (111), 10 parts of N,N,N',N'-Tetrakis(p-tolyl)benzidine, and 0.1 part of aluminum chloride (manufactured by Tokyo Chemical Industry Co., Ltd.) were added to a 300 ml three-necked flask containing 150 parts of nitrobenzene. The temperature in the flask was raised to 25° C., followed by stirring the mixture for 8 hours.

After the reaction, the reaction solution was concentrated under reduced pressure, toluene was added to the residue, followed by filtration, and the filtrate was concentrated in an evaporator and purified by the silica gel column chromatography (development solvent: n-heptane/toluene). Further, the collected product was recrystallized in a toluene/hexane mixture solution to give 0.8 part of the compound represented by the formula (C-2).

This compound was measured by MALDI-TOF MS and the peak top value thereof was 1087.

Synthesis Example 2

Synthesis of Compound (A-3)

(A-3)

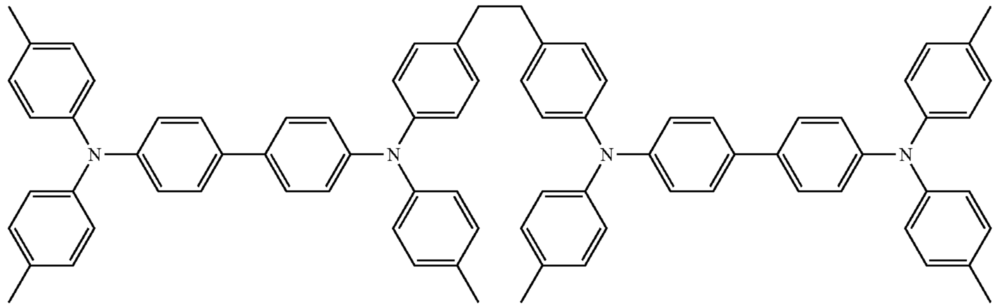

Under a flow of nitrogen at room temperature, 10 parts of the compound represented by the formula (111), 10 parts of N,N,N',N'-Tetrakis(p-tolyl)benzidine, and 1 part of sodium dispersion (product name: SD Super Fine, manufactured by Kobelco Eco-Solutions Co., Ltd.) were added to a 300 ml three-necked flask containing 340 parts of tetrahydrofuran. The mixture was stirred for 8 hours.

After the reaction, the reaction solution was concentrated under reduced pressure, toluene was added to the residue, followed by filtration, and the filtrate was concentrated in an evaporator and purified by the silica gel column chromatography (development solvent: n-heptane/toluene). Further, the collected product was recrystallized in a toluene/hexane mixture solution to give 0.05 part of the compound represented by the formula (A-3).

This compound was measured by MALDI-TOF MS and the peak top value thereof was 1087.

Example 1

<Producing Electrophotographic Photosensitive Member>

An aluminum cylinder (JIS-A3003, aluminum alloy) 24 mm in diameter and 257.5 mm in length was designated as a support (electroconductive support).

Subsequently, the following materials were prepared.

<Electroconductive Layer>

(Metal Oxide Particles)

The titanium dioxide of the core material could be produced by the known sulfuric acid method. That is, a solution containing titanium sulfate and titanyl sulfate was heated and hydrolyzed to produce a metatitanic acid slurry, which is then dehydrated and fired. As the core particles, anatase-type titanium oxide particles with an average primary particle diameter of 200 nm were used. Titanium niobium sulfuric acid solution containing 33.7 g of titanium in terms of $TiO_2$ and 2.9 g of niobium in terms of $Nb_2O_5$ was prepared. In pure water, 100 g of the core particles were dispersed to make 1 L of the suspension liquid and the suspension liquid was heated to 60 C. The titanium niobium sulfuric acid solution and 10 mol/l of sodium hydroxide solution were added dropwise to the suspension liquid over 3 hours so that the suspension liquid had a pH of 2 to 3. After dropping the whole amount, the pH of the mixture was adjusted to near neutral and an aggregating agent was added to precipitate the solid content. The supernatant was removed, the residue was filtered, and the residue was washed and dried at 110° C., to obtain an intermediate containing 0.1 wt % in terms C of the organic matter derived from the aggregating agent. The intermediate was fired in nitrogen gas at 800° C. for 1 hour to prepare metal oxide particles.

(Coating Liquid for Electroconductive Layer)

As a binder material, 80 parts of a phenol resin (monomer/oligomer of phenol resin) (product name: Plyophen J-325, resin solid content: 60%, density after curing: 1.3 g/cm 3, manufactured by DIC Corporation) was dissolved in 60 parts of 1-methoxy-2-propanol as a solvent to obtain the solution. To the solution, 100 parts of the metal oxide particles were added, which were placed in a vertical sand mill using 200 parts of glass beads with an average particle diameter of 1.0 mm for dispersion, and subjected to dispersion treatment under the condition that the temperature of the dispersion liquid was 23±3° C. and a rotation speed was 1500 rpm (circumferential speed of 5.5 m/s) for 2 hours to obtain a dispersion liquid. The glass beads were removed from the dispersion liquid with mesh. The dispersion liquid after removing the glass beads was pressure-filtered using PTFE filter paper (product name: PF060, manufactured by Advantec Toyo Kaisha, Ltd.). To the dispersion liquid after pressure-filtration, 0.015 part of silicone oil (product name: SH28PAINT ADDITIVE, manufactured by Dow Corning Toray Co., Ltd.) as a leveling agent and 15 parts of silicone resin particles (product name: KMP-590, average particle diameter: 2 μm, density: 1.3 g/$cm^3$, manufactured by Shin-Etsu Chemical Co., Ltd.) as a surface roughness imparting material were added and the mixture was stirred to obtain the coating liquid for the electroconductive layer.

The coating liquid for the electroconductive layer was dip-coated on the support under normal temperature and humidity (23° C./50% RH), and the resulting coating film was dried and thermally cured at 150° C. for 30 minutes to form an electroconductive layer with a film thickness of 30 μm.

<Undercoat Layer>

Subsequently, the following materials were prepared.

With 500 parts of toluene, 100 parts of rutile-type titanium oxide particles (average primary particle diameter: 50 nm, manufactured by Tayca corporation) were stirred and mixed. Then, 3.0 parts of vinyltrimethoxysilane (product name: KBM-1003, manufactured by Shin-Etsu Chemical Co., Ltd.) represented by the following formula (U-1), wherein m=0, n=3 and $R^1$ represents a methyl group was added and stirred for 8 hours. Then, toluene was distilled under reduced pressure and dried at 120° C. for 3 hours to obtain rutile-type titanium oxide particles surface-treated with vinyltrimethoxysilane.

(U-1)

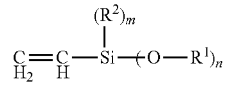

(Coating Liquid for Undercoat Layer)

- The above-mentioned rutile-type titanium oxide particles surface-treated with vinylmethoxysilane 18 parts
- N-methoxymethylated nylon (product name: TORESIN (trademark) EF-30T, manufactured by Nagase ChemteX Corporation) 4.5 parts
- Copolymerized nylon resin (product name: Amilan (trademark) CM8000, manufactured by Toray Industries, Inc.) 1.5 parts The above materials were added to a mixed solvent of 90 parts of methanol and 60 parts of 1-butanol to prepare a dispersion liquid.

The dispersion liquid was subjected to dispersion treatment in a vertical sand mill using 1.0 mm diameter glass beads for 5 hours to prepare a coating liquid for the undercoat layer. This coating liquid for the undercoat layer was dip coated on the above electroconductive layer, and the resulting coating film was dried at 100° C. for 10 minutes to form an undercoat layer with a film thickness of 1.1

<Charge Generating Layer>

(Coating Liquid for Charge Generating Layer)

A mixture of 15 parts of hydroxygallium phthalocyanine crystal in the crystal form showing strong peaks at Bragg angles 2θ±0.2° of 7.4° and 28.2° in an X-ray diffraction spectrum using CuKα radiation, 10 parts of polyvinyl butyral (product name: S-LEC (trademark) BX-1, manufactured by Sekisui Chemical Co., LTD.), 139 parts of cyclohexanone and 354 parts of 0.9 mm diameter glass beads was subjected to dispersion treatment using a sand mill (K-800, with a disk diameter of 70 mm, having 5 disks, manufactured by Igarashi Machine Production Co. Ltd (now Aimex Co., Ltd.),) at a cooling water temperature of 18° C. for 4 hours. The dispersion treatment was performed under the condition that the disk rotated 1,800 times per minute. The coating liquid for the charge generating layer was prepared by adding 326 parts of cyclohexanone and 465 parts of ethyl acetate to the dispersion. The coating liquid for the charge generating layer was dip-coated on the undercoat layer to form the coating film and the resulting coating film was dried at 100° C. for 10 minutes to form the charge generating layer. The film thickness was adjusted so that the value of the color density (measured by X-Rite, A-mode, manufactured by X-Rite Corporation) on the charge generating layer minus the color density on the undercoat layer was 0.80.

<Charge Transporting Layer>

Subsequently, the following material was prepared.

The charge transporting substance represented by the following formula (A-1) (N, N, N', N'-Tetrakis (p-tolyl) benzidine purified by sublimation (manufactured by Tokyo Chemical Industry Co., Ltd.)

(A-1)

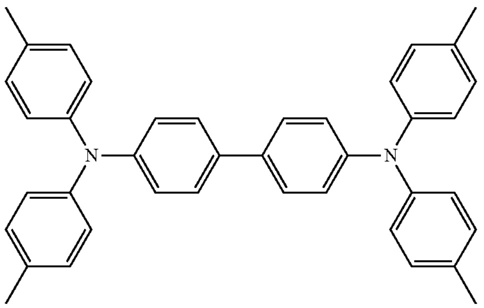

(Coating Liquid for Charge Transporting Layer)

Then, the coating liquid for the charge transporting layer was prepared by dissolving 60 parts of the compound represented by the formula (A-1), 0.013 part of the compound represented by the formula (A-2), 0.007 part of the compound represented by the formula (A-3), 26 parts of a compound represented by the following formula (C-1), and 100 parts of polycarbonate (product name: Iupilon (trademark) Z400, manufactured by Mitsubishi Engineering-Plastics Corporation) in a mixed solvent consisting of 250 parts of orthoxylene, 250 parts of methylal, and 250 parts of methyl benzoate. The coating liquid for the charge transporting layer was dip-coated on the charge generating layer to form a coating film, and the coating film was dried at 135° C. for 30 minutes to form a charge transporting layer with a film thickness of 18

(C-1)

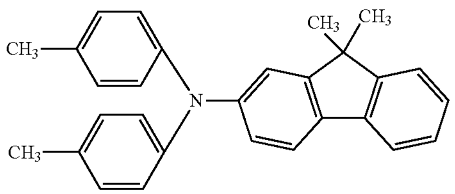

<Protection Layer>

Next, the following materials were prepared.

The compound represented by the formula (O-1) 4 parts

The compound represented by the formula (O-2) 6 parts

The above materials were mixed and stirred with 7 parts of cyclohexanone and 3 parts of 1-propanol to prepare a coating liquid for the protection layer.

The coating liquid for the protection layer was dip-coated on the charge transporting layer to form a coating film, and the resulting coating film was dried at 50° C. for 6 minutes. Then, under a nitrogen atmosphere, under the conditions of an acceleration voltage of 57 kV and a beam current of 5.0 mA, the distance between the support (object to be irradiated) and the electron beam irradiation window was set to 20 mm, and the coating film was irradiated with electron beams for 2.8 seconds while the support (object to be irradiated) was rotated at a speed of 200 rpm. The absorbed dose of electron beams at this time was measured to be 15 kGy. Then, the temperature was raised from 25° C. to 117° C. for 20 seconds under a nitrogen atmosphere, and the coating film was heated. The oxygen concentration was equal to or less than 10 ppm from the electron beam irradiation to the subsequent heat treatment. Then, the coating film was naturally cooled to 25° C. in the air, and the heat treatment was performed for 30 minutes under the condition where the temperature of the coating film was 105° C. to form a protection layer with a thickness of 1.9 Thus, the cylindrical (drum-like) electrophotographic photosensitive member with the protection layer of Example 1 was produced.

Then, the surface of the protection layer was polished and roughened. The polishing sheet (product name: C-8000, a base material: polyester film (thickness: 75 μm), manufactured by FUJIFILM Corporation) was used. More specifically, the surface was roughened under the condition that the polishing sheet feeding speed was 220 mm/s, the number of rotations of the electrophotographic photosensitive member was 40 rpm, the pressure was 3 $N/m^2$, and the polishing sheet and the electrophotographic photosensitive member were rotated in directions counter to each other for 30 seconds.

<Production of Toner>

(Preparation Process of Aqueous Media)

Into 300.0 parts of ion-exchanged water in a reaction vessel, 4.2 parts of sodium phosphate (dodecahydrate, manufactured by Rasa Industries, Ltd.) was put, and the mixture was kept at 65° C. for 1.0 hour while purging with nitrogen.

An aqueous solution of calcium chloride in which 2.8 parts of calcium chloride (dihydrate) was dissolved into 3.0 parts of ion-exchanged water was charged all at once to the mixture while stirring at 12000 rpm with a T. K. homomixer (manufactured by PRIMIX Corporation) to prepare an aqueous medium containing a dispersion stabilizer. Furthermore, 10 mass % hydrochloric acid was poured into the aqueous medium and the pH of the mixture was adjusted to 6.0 to obtain an aqueous medium.

(Preparation Process of Polymerizable Monomer Composition)

Styrene: 60.0 parts

C. I. Pigment Blue 15:3: 6.5 parts

The above materials were put into an attritor (manufactured by Nippon Coke & Engineering Co., Ltd.) and the mixture was further dispersed using 1.7 mm diameter zirconia particles at 220 rpm for 5.0 hours to prepare a pigment dispersion liquid.

The following materials were added to the pigment dispersion liquid.

Styrene: 20.0 parts n-Butyl acrylate: 20.0 parts

Divinylbenzene as crosslinking agent: 0.3 part

Saturated polyester resin: 5.0 parts (Polycondensate of propylene oxide-modified bisphenol A (2 mol adduct) and terephthalic acid (molar ratio of 10:12), glass transition temperature Tg=68° C., weight-average molecular weight Mw=10,000, molecular weight distribution Mw/Mn=5.12)

Fischer-Tropsch wax (melting point: 78° C.): 7.0 parts

The mixture was kept at 65° C., and dissolved and dispersed uniformly by stirring with a T. K. homomixer (manufactured by PRIMIX Corporation) at 500 rpm to prepare a polymerizable monomer composition.

(Hydrolysis Process of Organosilicon Compound for Surface Layer)

In a reaction vessel arranged with a stirrer and a thermometer, 60.0 parts of ion-exchanged water was weighed and the pH thereof was adjusted to 3.0 using 10 wt % hydrochloric acid. The resultant product was heated while stirring, and the temperature thereof was raised to 70° C. Then, 40.0 parts of methyltriethoxysilane was added to the product and stirred for 2 hours to hydrolyze an organosilicon compound for the surface layer. The end point of the hydrolysis was identified by visually confirming that the oil and the water became in a single layer without separation, and the resultant product was cooled to obtain the hydrolyzed liquid of the organosilicon compound for the surface layer.

(Granulation Process)

The polymerizable monomer composition was put into the aqueous medium and 9.0 parts of t-butyl peroxy pivalate as a polymerization initiator was added to the mixture while keeping the temperature of the aqueous medium at 70° C. and the number of rotations of the stirrer at 12000 rpm. Granulation was continued in the stirrer at 12000 rpm for 10 minutes.

(Polymerization Process)

The stirrer was changed from a high-speed stirrer to a propeller stirrer, the polymerization was performed while keeping the temperature in the vessel at 70° C. for 5.0 hours while stirring at 150 rpm, then the temperature was raised to 85° C. and the content was heated for 2.0 hours for the polymerization reaction, to obtain a slurry of toner particles. Then, the slurry was cooled to 70° C. and the pH of the slurry was measured to be 5.0. While stirring was continued at the temperature of 70° C., 20.0 parts of the hydrolyzed liquid of the organosilicon compound for the surface layer was added to the slurry and the surface layer formation of the toner particles was started. After keeping stirring for 90 minutes, the pH of the slurry was adjusted to 9.0 and the slurry was maintained for another 300 minutes to complete the condensation of the slurry using an aqueous sodium hydroxide solution, to form the surface layers.

(Cleaning and Drying Process)

After completion of the polymerization process, the slurry of the toner particles was cooled, hydrochloric acid was added to the slurry of the toner particles to adjust the pH of the slurry to 1.5 or lower, and the mixture was stirred and left for 1 hour, followed by solid-liquid separation with a pressurized filter to obtain a toner cake. The toner cake was then reslurried with ion-exchanged water to make a dispersion liquid again, followed by solid-liquid separation with the pressurized filter. The reslurring and solid-liquid separation were repeated until the electrical conductivity of the filtrate became 5.0 μS/cm or less, and then finally, solid-liquid separation was performed to obtain a toner cake. The resulting toner cake was dried by an air flow drying flash-jet dryer (manufactured by Seishin Enterprise Co., Ltd.), and the fine coarse powder was cut using a multi-division classifier utilizing the Coanda effect to obtain toner particles. The drying was performed under the conditions that a blowing temperature was 90° C. and the temperature of the outlet of the dryer was 40° C., and the feeding speed of the toner cake was adjusted so that the temperature of the outlet of the dryer did not deviate from 40° C. corresponding to the water content of the toner cake. Silicon mapping was carried out in the cross-sectional TEM observation of the toner particles, and it was confirmed that uniform silicon atoms existed in the surface layer, and that the ratio of the number of such division axes that the thicknesses of the surface layers of the toner particles each containing an organosilicon polymer were 2.5 nm or less was 20.0% or less. In the following Examples and Comparative Examples, it was confirmed by the similar silicon mapping that in the surface layers of the toner particles each containing an organosilicon polymer, uniform silicon atoms existed and that the ratio of the number of such division axes that the thicknesses of the surface layers were 2.5 nm or less was 20.0% or less. In Example 1, the obtained toner particles were used as the toner without external addition.

<Analysis of Amount of Compound>

The mass ratios of each charge transporting substance, the binder resin, and each compound relative to the total mass of the charge transporting layer were analyzed under the following conditions.

The surface of the obtained electrophotographic photosensitive member was scraped off with a razor to obtain a charge transporting layer section. The charge transporting layer section was dissolved in deuterated chloroform, and then subjected to 1H-NMR measurement (equipment: AVANCEIII 500, manufactured by Bruker Corporation) to determine the mass ratios of each of the compound represented by the formula (C-1), the compound represented by the formula (C-2), and the binder resin relative to the total mass of the charge transporting layer.

In addition, the charge transporting layer section was dissolved in chloroform and dropped into methanol to precipitate the binder resin. The obtained methanol solution was then filtered using a 0.45 μm diameter filter, and the obtained filtrate was subjected to liquid chromatography mass spectrometry (LC/MS) to determine the mass ratios of each of the compound represented by the formula (A-2) and the compound represented by the formula (A-3) relative to the compound represented by the formula (A-1).

Based on the above analysis, the contents were calculated. The results obtained are shown in Table 1.

Example 2

The electrophotographic photosensitive member was prepared in the same manner as in Example 1, except that the content of the compound represented by the formula (A-2) was changed to 0.011 part and the content of the compound represented by the formula (A-3) was changed to 0 part.

Example 3

The electrophotographic photosensitive member was prepared in the same manner as in Example 1, except that the content of the compound represented by the formula (A-2) was changed to 0.019 part and the content of the compound represented by the formula (A-3) was changed to 0.018 part.

Example 4

The electrophotographic photosensitive member was prepared in the same manner as in Example 1, except that the content of the compound represented by the formula (A-2) was changed to 0.015 part and the content of the compound represented by the formula (A-3) was changed to 0.006 part.

Example 5

The electrophotographic photosensitive member was prepared in the same manner as in Example 1, except that the content of the compound represented by the formula (A-1) was changed to 60 parts, the content of the compound represented by the formula (A-2) was changed to 0.016 part, the content of the compound represented by the formula (A-3) was changed to 0 part and the content of the compound represented by the formula (C-1) was changed to 0 part.

Example 6

The electrophotographic photosensitive member was prepared in the same manner as in Example 1, except that the content of the compound represented by the formula (A-1) was changed to 60 parts, the content of the compound represented by the formula (A-2) was changed to 0.019 part, and the content of the compound represented by the formula (C-1) was changed to 0 part.

Example 7

The electrophotographic photosensitive member was prepared in the same manner as in Example 1, except that the content of the compound represented by the formula (A-1) was changed to 60 parts, the content of the compound represented by the formula (A-2) was changed to 0.022 part, the content of the compound represented by the formula (A-3) was changed to 0.006 part and the content of the compound represented by the formula (C-1) was changed to 0 part.

Example 8

The electrophotographic photosensitive member was prepared in the same manner as in Example 1, except that the content of the compound represented by the formula (A-1) was changed to 70 parts, the content of the compound represented by the formula (A-2) was changed to 0.025 part, the content of the compound represented by the formula (A-3) was changed to 0 part and the content of the compound represented by the formula (C-1) was changed to 30 parts.

Example 9

The electrophotographic photosensitive member was prepared in the same manner as in Example 1, except that the content of the compound represented by the formula (A-1) was changed to 70 parts, the content of the compound represented by the formula (A-2) was changed to 0.030 part, the content of the compound represented by the formula (A-3) was changed to 0.010 part and the content of the compound represented by the formula (C-1) was changed to 30 parts.

Example 10

The electrophotographic photosensitive member was prepared in the same manner as in Example 1, except that the content of the compound represented by the formula (A-1) was changed to 77 parts, the content of the compound represented by the formula (A-2) was changed to 0.034 part, the content of the compound represented by the formula (A-3) was changed to 0.006 part and the content of the compound represented by the formula (C-1) was changed to 23 parts.

Example 11

The electrophotographic photosensitive member was prepared in the same manner as in Example 1, except that the content of the compound represented by the formula (A-1) was changed to 100 parts, the content of the compound represented by the formula (A-2) was changed to 0.036 part, the content of the compound represented by the formula (A-3) was changed to 0 part and the content of the compound represented by the formula (C-1) was changed to 0 part.

Example 12

The electrophotographic photosensitive member was prepared in the same manner as in Example 1, except that the content of the compound represented by the formula (A-1) was changed to 100 parts, the content of the compound represented by the formula (A-2) was changed to 0.070 part, the content of the compound represented by the formula (A-3) was changed to 0.058 part and the content of the compound represented by the formula (C-1) was changed to 0 part.

Example 13

The electrophotographic photosensitive member was prepared in the same manner as in Example 1, except that the content of the compound represented by the formula (A-1) was changed to 100 parts, the content of the compound represented by the formula (A-2) was changed to 0.043 part, the content of the compound represented by the formula (A-3) was changed to 0.010 part and the content of the compound represented by the formula (C-1) was changed to 0 part.

Example 14

The electrophotographic photosensitive member was prepared in the same manner as in Example 1, except that the content of the compound represented by the formula (A-1) was changed to 100 parts, the content of the compound represented by the formula (A-2) was changed to 0.062 part, the content of the compound represented by the formula (A-3) was changed to 0.024 part and the content of the compound represented by the formula (C-1) was changed to 0 part.

Example 15

The electrophotographic photosensitive member was prepared in the same manner as in Example 1, except that the content of the compound represented by the formula (A-1) was changed to 100 parts, the content of the compound represented by the formula (A-2) was changed to 0.057 part, the content of the compound represented by the formula (A-3) was changed to 0.026 part and the content of the compound represented by the formula (C-1) was changed to 0 part.

Example 16

The electrophotographic photosensitive member was prepared in the same manner as in Example 1, except that the content of the compound represented by the formula (A-1) was changed to 100 parts, the content of the compound represented by the formula (A-2) was changed to 0.051 part, the content of the compound represented by the formula (A-3) was changed to 0.026 part and the content of the compound represented by the formula (C-1) was changed to 0 part.

Example 17

The electrophotographic photosensitive member was prepared in the same manner as in Example 1, except that the content of the compound represented by the formula (A-1) was changed to 100 parts, the content of the compound represented by the formula (A-2) was changed to 0.049 part, the content of the compound represented by the formula (A-3) was changed to 0.008 part and the content of the compound represented by the formula (C-1) was changed to 0 part.

Example 18

The electrophotographic photosensitive member was prepared in the same manner as in Example 1, except that the content of the compound represented by the formula (A-1) was changed to 42 parts, the content of the compound represented by the formula (A-2) was changed to 0.011 part, the content of the compound represented by the formula (A-3) was changed to 0.008 part and the compound represented by the formula (C-1) was changed to 18 parts of the compound represented by the formula (C-2).

Example 19

The electrophotographic photosensitive member was prepared in the same manner as in Example 1, except that the content of the compound represented by the formula (A-1) was changed to 60 parts, the content of the compound represented by the formula (A-2) was changed to 0.041 part, the content of the compound represented by the formula (A-3) was changed to 0.049 part and the content of the compound represented by the formula (C-1) was changed to 0 part.

Example 20

The electrophotographic photosensitive member was prepared in the same manner as in Example 1, except that the content of the compound represented by the formula (A-1) was changed to 70 parts, the content of the compound represented by the formula (A-2) was changed to 0.029 part, the content of the compound represented by the formula (A-3) was changed to 0.011 part and the compound represented by the formula (C-1) was changed to 30 parts of the compound represented by the formula (C-2).

Example 21

The electrophotographic photosensitive member was prepared in the same manner as in Example 1, except that the content of the compound represented by the formula (A-1) was changed to 100 parts, the content of the compound represented by the formula (A-2) was changed to 0.027 part, the content of the compound represented by the formula (A-3) was changed to 0.015 part and the content of the compound represented by the formula (C-1) was changed to 0 part.

Comparative Example 1

The electrophotographic photosensitive member was prepared in the same manner as in Example 1, except that the content of the compound represented by the formula (A-1) was changed to 42 parts, the content of the compound represented by the formula (A-2) was changed to 0 part, the content of the compound represented by the formula (A-3) was changed to 0 part and the content of the compound represented by the formula (C-1) was changed to 0 part.

Comparative Example 2

The electrophotographic photosensitive member was prepared in the same manner as in Example 1, except that the content of the compound represented by the formula (A-1) was changed to 60 parts, the content of the compound represented by the formula (A-2) was changed to 0.040 part, the content of the compound represented by the formula (A-3) was changed to 0.075 part and the content of the compound represented by the formula (C-1) was changed to 0 part.

Comparative Example 3

The electrophotographic photosensitive member was prepared in the same manner as in Example 1, except that the content of the compound represented by the formula (A-1) was changed to 60 parts, the content of the compound represented by the formula (A-2) was changed to 0.058 part, the content of the compound represented by the formula (A-3) was changed to 0.109 part and the content of the compound represented by the formula (C-1) was changed to 0 part.

Comparative Example 4

The electrophotographic photosensitive member was prepared in the same manner as in Example 1, except that the content of the compound represented by the formula (A-1) was changed to 70 parts, the content of the compound represented by the formula (A-2) was changed to 0.090 part, the content of the compound represented by the formula (A-3) was changed to 0.145 part and the compound represented by the formula (C-1) was changed to 30 parts of the compound represented by the formula (C-2).

Comparative Example 5

The electrophotographic photosensitive member was prepared in the same manner as in Example 1, except that the content of the compound represented by the formula (A-1) was changed to 70 parts, the content of the compound represented by the formula (A-2) was changed to 0.152 part, the content of the compound represented by the formula (A-3) was changed to 0.050 part and the compound represented by the formula (C-1) was changed to 30 parts of the compound represented by the formula (C-2).

[Evaluation]

Using the electrophotographic photosensitive members prepared in Examples 1 to 21 and Comparative Examples 1 to 5, memories on the images were evaluated under the following conditions. A modified version of the laser beam printer manufactured by Hewlett-Packard, the product name of HP Color LaserJet Enterprise M653dn (75 PPM, with the above-described toner) was used for the electrophotographic apparatus. The electrophotographic apparatus used in the evaluation was modified so that the amount of image exposure light and the voltage applied to the charging roller can be adjusted and measured without using pre-exposure light.

First, each of the photosensitive members of Examples and Comparative Examples was mounted on the cyan cartridge of the electrophotographic apparatus, mounted on the cyan cartridge station, and the images were output.

The image output was performed consecutively in the order of a solid white image (1 sheet), images for ghost evaluation (5 sheets), a solid black image (1 sheet), and images for ghost evaluation (5 sheets).

Figure 5:
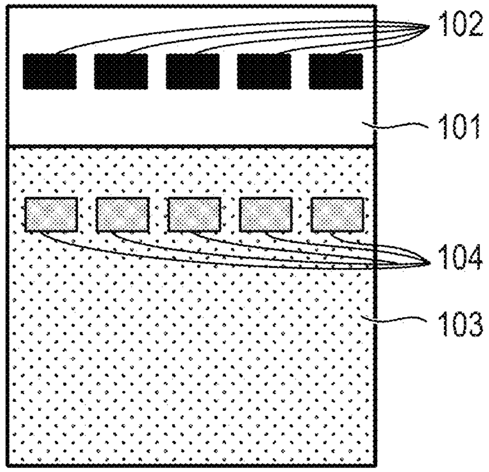
FIG. 5 is a view for illustrating an example of an image for the ghost evaluation of the present invention.
Figure 6:
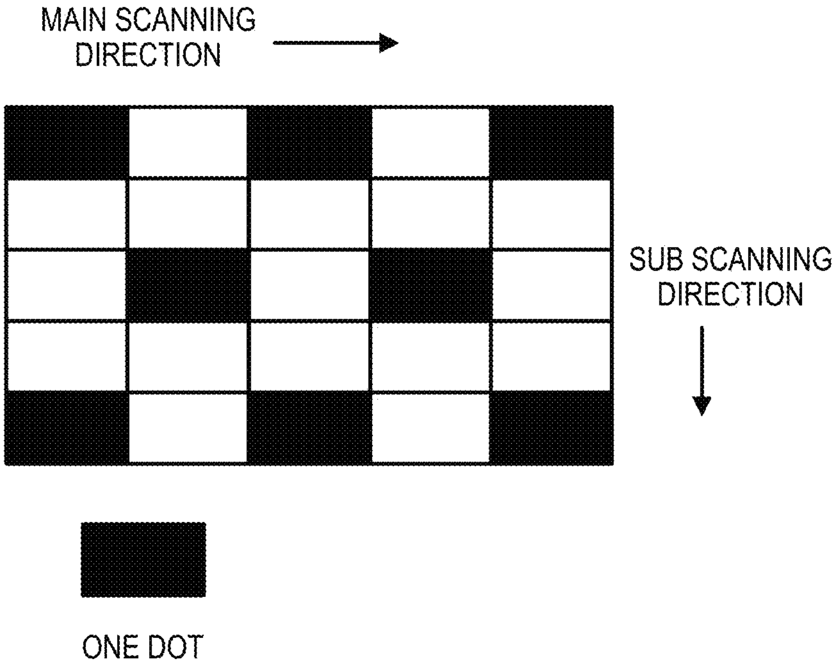
FIG. 6 is a view for illustrating an example of a halftone image of the present invention.

As the image for ghost evaluation, as shown in FIG. 5, the image in which square solid images 102 were output in a white image 101 at the top of the image, and then a halftone image of the keima (knight of Japanese chess) patterns as shown in FIG. 6 was created, was used.

The ghost evaluation was carried out by measuring the density difference (Macbeth density difference) between the Macbeth density of the halftone image 103 of the one-dot keima (knight of Japanese chess) patterns and the Macbeth density of the ghost part 104 (where positive ghost can occur). A spectrodensitometer (product name: X-Rite504/508, manufactured by X-Rite Corporation) was used to evaluate the Macbeth density differences at 10 points in one sheet of the image for ghost evaluation. This operation was performed on all 10 sheets of the images for ghost evaluation, and the average of the total of 100 points was calculated as the Macbeth density difference. The difference between the initial Macbeth density difference and the Macbeth density difference after 15000 sheets were output was used as the ghost evaluation. The smaller the value of the ghost evaluation, the more the ghost can be evaluated as suppressed. The relative ghost evaluation values of Examples 1 to 21 and Comparative Examples 2 to 5 were calculated using the ghost evaluation value of Comparative Example 1 as 1. The results are shown in Table 1 below.

DB shown in Table 1 is the ratio of the content of the compound represented by the formula (A-1) to the content of the binder resin, and D/D is the ratio of the content of the compound represented by the formula (A-1) to the sum of the content of the compound represented by the formula (A-2), the content of the compound represented by the formula (A-3), the content of the compound represented by the formula (C-1) and the content of the compound represented by the formula (C-2).

TABLE 1

| | CTM | D/B | D/D | Relative ghost evaluation value | Ratio of compound(s) relative to charge transporting layer (A-2) | (A-3) | (A-2) + (A-3) |
|---|---|---|---|---|---|---|---|
| Example 1 | (C-1) | 6:10 | 7:3 | 0.91 | 0.022% | 0.005% | 0.027% |
| Example 2 | (C-1) | 6:10 | 7:3 | 0.95 | 0.019% | 0.000% | 0.019% |
| Example 3 | (C-1) | 6:10 | 7:3 | 0.93 | 0.032% | 0.013% | 0.045% |
| Example 4 | (C-1) | 6:10 | 7:3 | 0.90 | 0.025% | 0.004% | 0.029% |
| Example 5 | (C-1) | 6:10 | 10:0 | 0.93 | 0.027% | 0.000% | 0.027% |
| Example 6 | (C-1) | 6:10 | 10:0 | 0.89 | 0.032% | 0.007% | 0.039% |
| Example 7 | (C-1) | 6:10 | 10:0 | 0.88 | 0.036% | 0.006% | 0.042% |
| Example 8 | (C-1) | 10:10 | 7:3 | 0.94 | 0.025% | 0.000% | 0.025% |
| Example 9 | (C-1) | 10:10 | 7:3 | 0.90 | 0.030% | 0.007% | 0.036% |
| Example 10 | (C-1) | 10:10 | 7:3 | 0.89 | 0.034% | 0.006% | 0.040% |
| Example 11 | (C-1) | 10:10 | 10:0 | 0.88 | 0.036% | 0.000% | 0.036% |
| Example 12 | (C-1) | 10:10 | 10:0 | 0.91 | 0.070% | 0.058% | 0.129% |
| Example 13 | (C-1) | 10:10 | 10:0 | 0.84 | 0.043% | 0.010% | 0.052% |
| Example 14 | (C-1) | 10:10 | 10:0 | 0.85 | 0.062% | 0.024% | 0.086% |
| Example 15 | (C-1) | 10:10 | 10:0 | 0.87 | 0.057% | 0.026% | 0.083% |
| Example 16 | (C-1) | 10:10 | 10:0 | 0.85 | 0.051% | 0.026% | 0.077% |
| Example 17 | (C-1) | 10:10 | 10:0 | 0.83 | 0.049% | 0.008% | 0.057% |
| Example 18 | (C-2) | 6:10 | 7:3 | 0.97 | 0.019% | 0.006% | 0.024% |
| Example 19 | (C-2) | 6:10 | 10:0 | 0.96 | 0.068% | 0.049% | 0.102% |
| Example 20 | (C-2) | 10:10 | 7:3 | 0.94 | 0.029% | 0.008% | 0.051% |
| Example 21 | (C-2) | 10:10 | 10:0 | 0.92 | 0.027% | 0.015% | 0.042% |
| Comparative Example 1 | (C-1) | 6:10 | 7:3 | 1.00 | 0.000% | 0.000% | 0.000% |
| Comparative Example 2 | (C-1) | 6:10 | 10:0 | 1.16 | 0.067% | 0.075% | 0.142% |
| Comparative Example 3 | (C-1) | 6:10 | 10:0 | 1.13 | 0.097% | 0.109% | 0.205% |
| Comparative Example 4 | (C-2) | 10:10 | 7:3 | 1.14 | 0.090% | 0.101% | 0.191% |
| Comparative Example 5 | (C-2) | 10:10 | 7:3 | 1.04 | 0.152% | 0.035% | 0.187% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-150265, filed Sep. 21, 2022, which is hereby incorporated by reference herein in its entirety.

What is claimed is:

1. An electrophotographic photosensitive member comprising:

a support, a charge generating layer, and a charge transporting layer in this order, wherein the charge transporting layer comprises:

a compound represented by a following formula (A-1), and at least one selected from the group consisting of a compound represented by a following formula (A-2) and a compound represented by a following formula (A-3), (A-1)

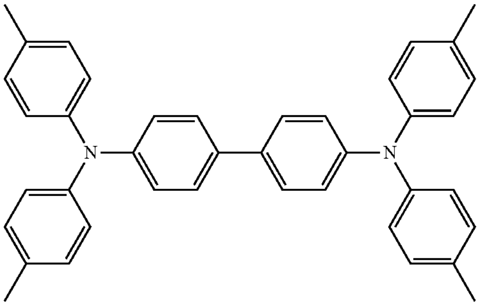

(A-2)

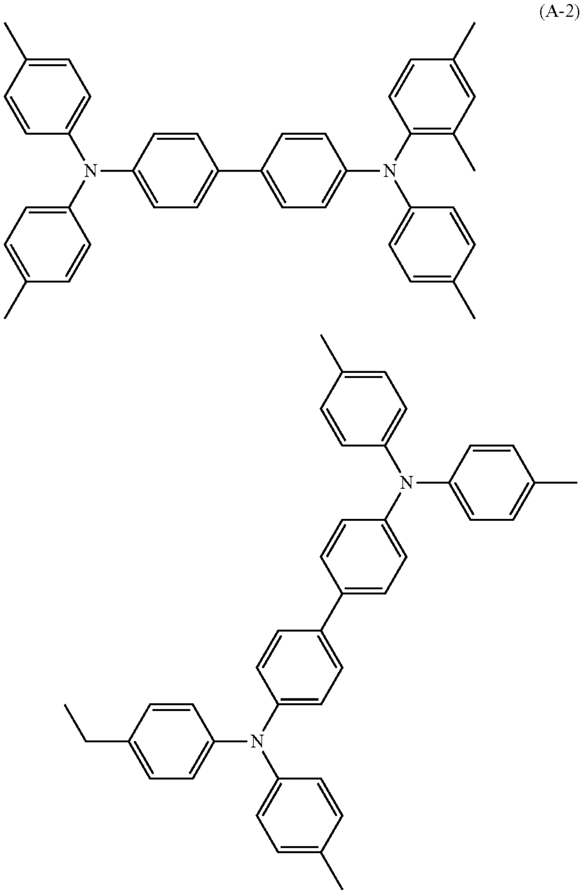

(A-3)

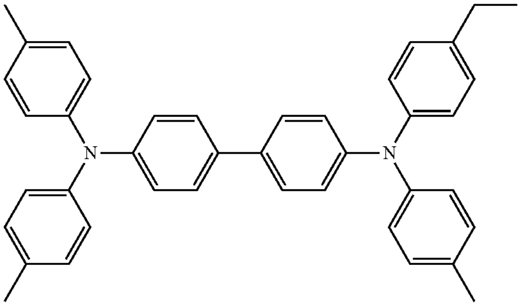

-continued

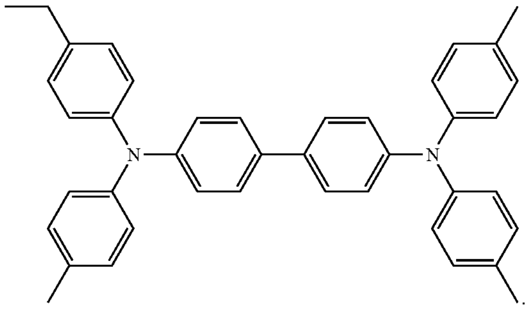

2. The electrophotographic photosensitive member according to claim 1, wherein, in the charge transporting layer, a sum of a content "A2" of the compound represented by the formula (A-2) and a content "A3" of the compound represented by the formula (A-3) satisfies a following relationship (1), the content "A2" of the compound represented by the formula (A-2) satisfies a following relationship (2), and the content "A3" of the compound represented by the formula (A-3) satisfies a following relationship (3), $$0.019\ \text{mass}\ \% \leq A2+A3 \leq 0.129\ \text{mass}\ \% \quad (1)$$

$$0.019\ \text{mass}\ \% \leq A2 \leq 0.070\ \text{mass}\ \% \quad (2)$$

$$0\ \text{mass}\ \% \leq A3 \leq 0.058\ \text{mass}\ \% \quad (3).$$

3. The electrophotographic photosensitive member according to claim 1, wherein the charge transporting layer further comprises a binder resin, and a content of the compound represented by the formula (A-1) with respect to a content of the binder resin is 60 to 100 mass % in the charge transporting layer.

4. The electrophotographic photosensitive member according to claim 1, wherein a content of a compound represented by a following formula (C-1) with respect to a content of the compound represented by the formula (A-1) is 43 mass % or less in the charge transporting layer, and a content of a compound represented by a following formula (C-2) with respect to the content of the compound represented by the formula (A-1) is 43 mass % or less in the charge transporting layer, (C-1)

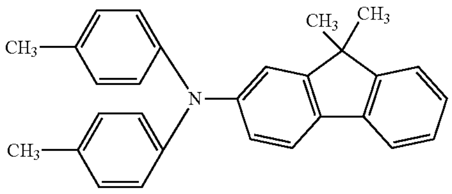

-continued (C-2)

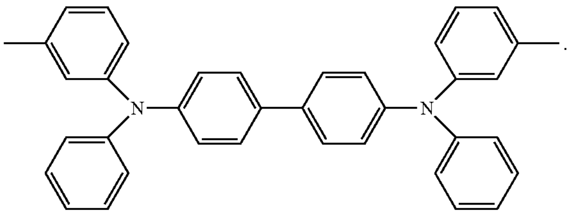

5. The electrophotographic photosensitive member according to claim 1, wherein a sum of a content of the compound represented by the formula (A-2), a content of the compound represented by the formula (A-3), a content of a compound represented by a following formula (C-1) and a content of a compound represented by a following formula (C-2) with respect to a content of the compound represented by the formula (A-1) is 43 mass % or less in the charge transporting layer, (C-1)

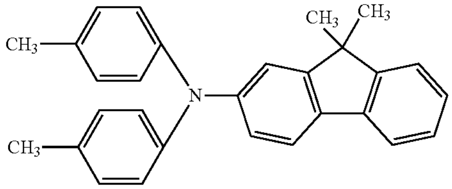

(C-2)

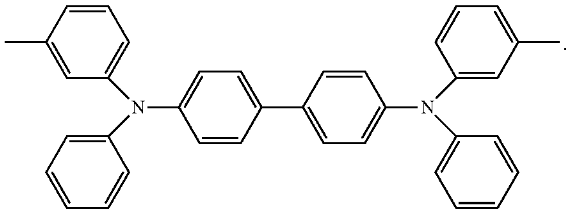

6. The electrophotographic photosensitive member according to claim 1, wherein the charge generating layer comprises hydroxy phthalocyanine.

7. A process cartridge comprising:

an electrophotographic photosensitive member and at least one unit selected from the group consisting of a charging unit, a developing unit, and a cleaning unit, the process cartridge integrally supporting the electrophotographic photosensitive member and the at least one unit, and being detachably attachable to a main body of an electrophotographic apparatus, wherein the electrophotographic photosensitive member comprises:

a support, a charge generating layer, and a charge transporting layer in this order, wherein the charge transporting layer comprises:

a compound represented by a following formula (A-1), and at least one selected from the group consisting of a compound represented by a following formula (A-2) and a compound represented by a following formula (A-3), (A-1)

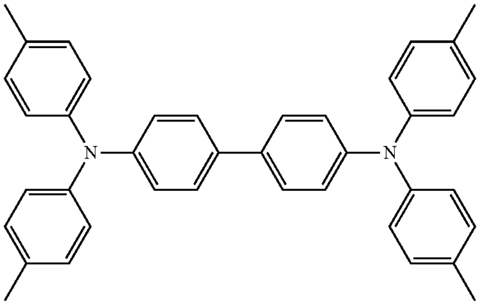

(A-2)

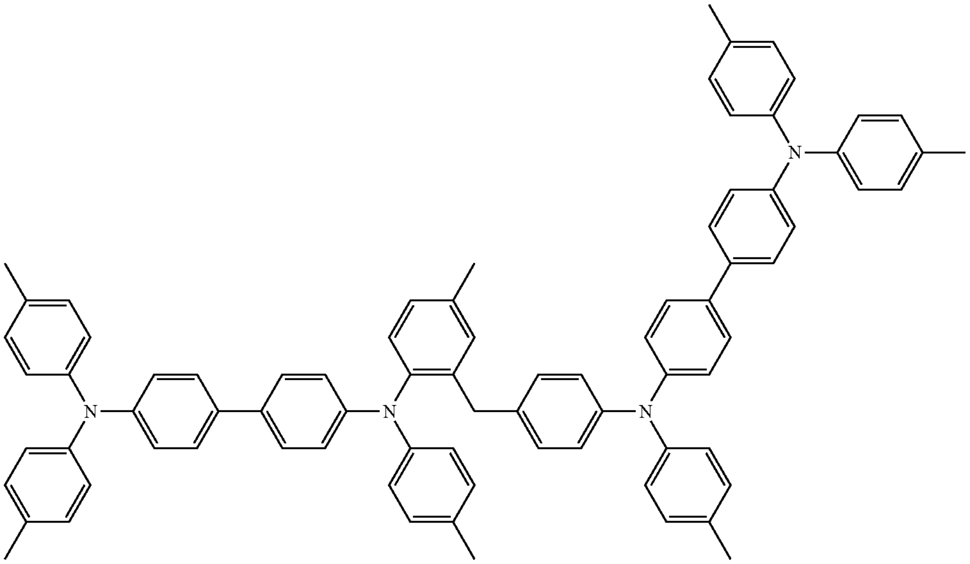

(A-3)

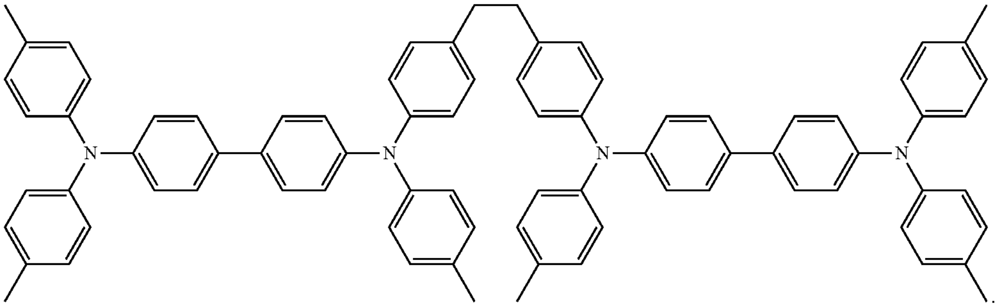

8. An electrophotographic apparatus comprising:

an electrophotographic photosensitive member, an exposing unit, a charging unit, a developing unit, and a transfer unit, wherein the electrophotographic photosensitive member comprises:

a support, a charge generating layer, and a charge transporting layer in this order, wherein the charge transporting layer comprises:

a compound represented by a following formula (A-1), and at least one selected from the group consisting of a compound represented by a following formula (A-2) and a compound represented by a following formula (A-3), (A-1)
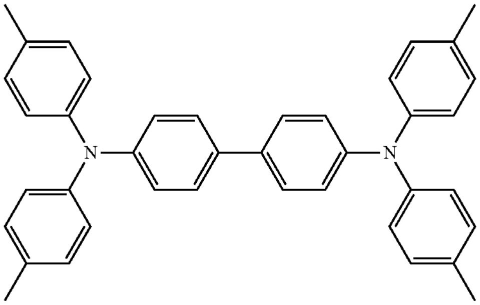
(A-2)
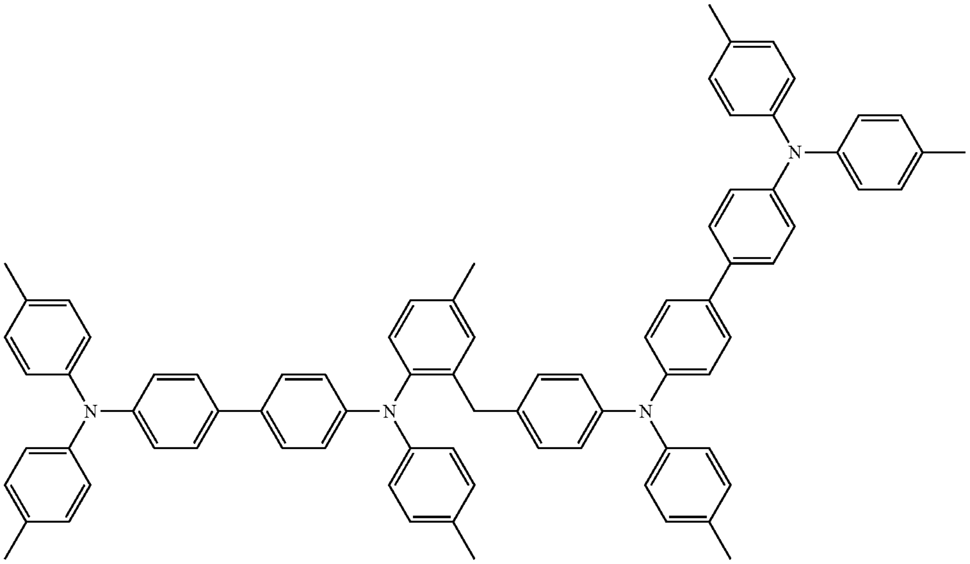
(A-3)
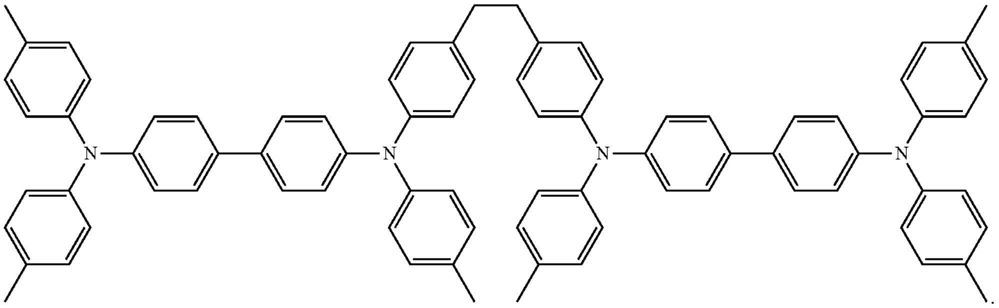
* * * * *